A. R. ROSS.
BAKING OVEN.
APPLICATION FILED JAN. 13, 1919.
1,349,436.
Patented Aug. 10, 1920.
2 SHEETS—SHEET 1.
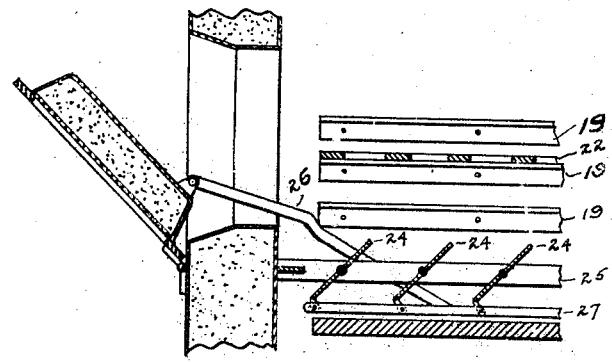
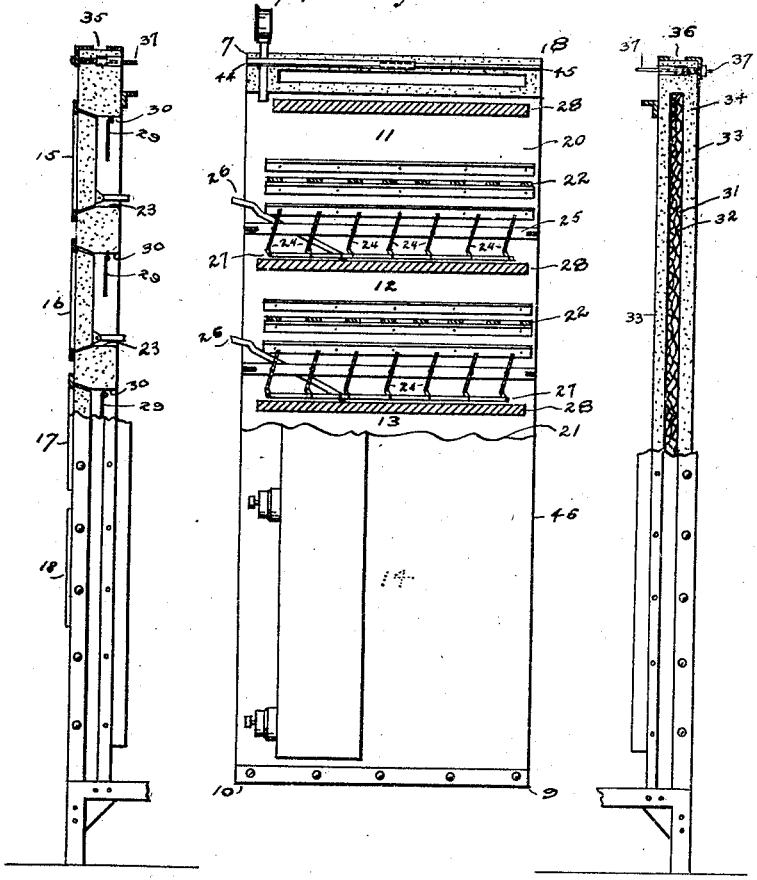
Fig. 1.   Fig. 2.   Fig. 3.
INVENTOR
Allen R. Ross
BY
ATTORNEY

UNITED STATES PATENT OFFICE.

ALLEN R. ROSS, OF SEATTLE, WASHINGTON.

BAKING-OVEN.

1,349,436.  Specification of Letters Patent.  Patented Aug. 10, 1920.

Application filed January 13, 1919. Serial No. 270,959.

*To all whom it may concern:*

Be it known that I, ALLEN R. ROSS, a citizen of the United States, residing at Seattle, in the county of King and State of Washington, have invented a certain new and useful Invention Relative to Baking-Ovens, of which the following is a specification.

My invention relates to the art of baking ovens.

Baking ovens as heretofore designed and commonly used by bakers are subject to a great loss of heat. In electric operation particularly, the conservation of heat is especially a vital factor; otherwise, the cost of operation is excessive if not prohibitive. This is due not only to poor insulation but also to the opening of the doors upon the introduction or removal of the food to be heated or baked. Special difficulty in providing insulation is encountered in ovens whose walls are not made integral, and hence the common practice is to use those with integrally formed walls and to make complete replacement at great expense of same when the capacity of such oven has been outgrown.

Tubes through the insulating material, especially when such material is diatomaceous earth, are necessary to protect the tie-rods to hold the walls together, and at the same time such tubes must be so constructed as not to prevent the drawing together of the walls throughout their contacting surfaces, as more fully explained hereinafter.

The objects of my invention are:—To provide an oven which meets all of the above conditions; to provide a heat-insulated walled oven having at least one demountable wall held in place by tie-rods protected by telescoping tubes so that a tight joint can be formed between the demountable wall section or part and the oven body or part.

The above general objects of my invention together with others inhering in the same are attained by the mechanism illustrated in the accompanying drawings, the same being merely a preferred form of embodiment of my invention, throughout which drawings like reference numerals indicate like parts;

Figure 1, is a view of a sectional-side elevation of the heat insulated demountable front wall of the oven on broken line 1, 1 of Fig. 5;

Fig. 2, is a view of a sectional-side elevation of the heat insulated body part of the oven on broken line 1, 1 of Fig. 5;

Fig. 3, is a view of a sectional-side elevation of the heat insulated demountable back wall on broken line 1, 1 of Fig. 5;

Fig. 4, is an enlarged cross-sectional view of a portion of the oven showing the shutters connected to its respective door;

Figure 6:
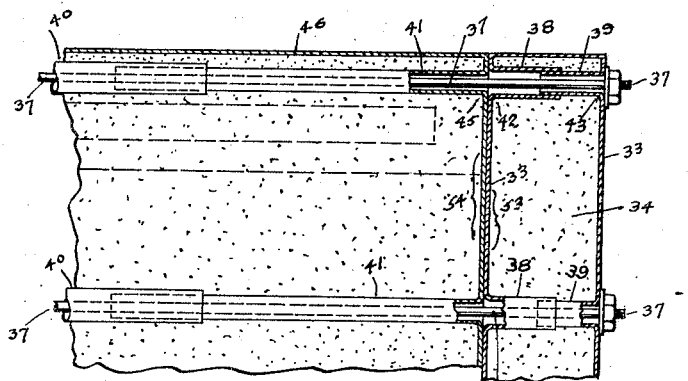
Fig. 6, is an enlarged cross-sectional view of a part of the oven showing telescoping tubes and tie-rod construction.
Figure 5:
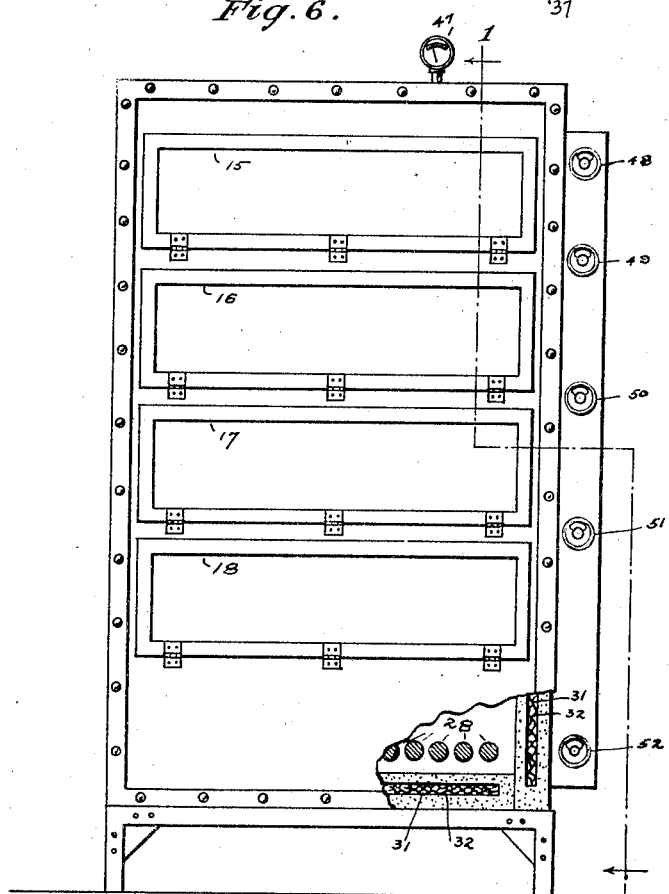
Fig. 5 is a front sectional view of an oven embodying my invention.

The oven body 7, 8, 9 and 10 in the design chosen for purposes of illustration is provided with freely intercommunicating compartments 11, 12, 13 and 14, and each compartment is provided respectively with doors 15, 16, 17 and 18. Grill supports 19 are fixed at intervals to the side walls 20 and 21 of the compartments on which supports rest movable grills 22. Below the first grill supports of each compartment, which are preferably about on a level with the bottom 23 of the doorways, are secured means to temporarily shut off the portion of the oven below the level in question. As one such form of means, I illustrate shutters 24, pivotally connected to bars 25 secured to the sides of the oven. These shutters are preferably connected to the doors to provide for their automatic opening and closing in conjunction with the opening of said doors through the medium of rods 26 and 27, the latter extending across the ends of shutters 24, all of which shutters are pivotally connected to said rod 27. Immediately below the shutters 24 are secured in each compartment the heating elements 28, extending lengthwise of the oven. These are fixed at intervals so that the compartments are freely intercommunicating. A swinging gate 29 is suspended from the top of the doorway 30 and serves to prevent the escape of heat from the upper portion of the compartment and the oven.

The walls are constructed for purposes of heat insulation, reference being had to Fig. 3 for purposes of illustration, with the air-celled space 31 formed of corrugated asbestos sheeting 32, which, together with the sheet iron wall 33 forms the space 34 which is filled with diatomaceous earth. In order to provide for increasing the capacity of the oven as occasion demands, I make preferably both the front and rear walls 35 and 36 respectively demountable, (manifestly, one demountable wall would suffice), so that another section of desired depth similar in all respects to the oven body part 7, 8, 9 and 10 may be placed against said oven body part after moving forward the front wall or after moving back the rear wall, in the form chosen for illustrating such increasing of capacity.

The walls 35 and 36 and the oven body part 7, 8, 9 and 10 are all held firmly together by tie-rods 37 inserted in telescoping tubes 38 and 39 and coöperating telescoping tubes 40 and 41. These tubes pass through the diatomaceous earth and have their ends 42 and 43, using for example the tubes in the rear wall, made integral with the sheet iron wall 33; while the tubes 40 and 41 of the oven body part 7, 8, 9 and 10, have their ends 44 and 45 made integral with the sheet iron wall 46. The pyrometer 47 serves to indicate the degree of heat in the oven. Switches 48, 49, 50, 51 and 52 serve to control the electric current to the heating elements in the respective compartments.

To conserve heat and to retain the advantage of a demountable wall, whether the same be an end, side or top wall for increasing the oven capacity, I provide telescoping tubes for the tie-rods through the diatomaceous earth and since these slide one within the other a very tight joint may be formed along the whole of the contacting surface as at 53 and 54 sections. Otherwise, the tie-rods would effectively pull the walls together only at the abutting ends, for example 45 and 42 of the enveloping or protector tubes and said tubes would thus be made to work against one another and render the binding force of the tie-rods of no effect at the intermediate portions 53 and 54 of the contacting surfaces of the metal walls 46 and 33.

Preferably, I provide both the demountable wall and the oven body part with these telescoping tubes but manifestly a practical joint could be made by having only one of these parts so equipped.

Obviously, changes may be made in the forms, dimensions and arrangements of the parts of my invention without departing from the principle thereof, the above setting forth only a preferred form of embodiment.

I claim:

1. An oven, whose walls are heat insulated, embodying one or more demountable walls, telescoping tie-rod protector tubes in said oven walls, and tie rods passing through said protector tubes whereby said demountable wall is held tightly against said oven walls.

2. An oven wall embodying telescoping tie-rod protector tubes.

In witness whereof, I hereunto subscribe my name this 7th day of Jan. A. D., 1919.

ALLEN R. ROSS.